US012586225B2

(12) United States Patent
Park et al.

(10) Patent No.: US 12,586,225 B2
(45) Date of Patent: Mar. 24, 2026

(54) APPARATUS FOR ESTIMATING A DEPTH OF IMAGE AND METHOD THEREOF

(71) Applicants: Hyundai Motor Company, Seoul (KR); Kia Corporation, Seoul (KR); KOREA UNIVERSITY RESEARCH & BUSINESS FOUNDATION, Seoul (KR)

(72) Inventors: Jin Ho Park, Seoul (KR); Jin Sol Kim, Hwaseong-Si (KR); Jang Yoon Kim, Seoul (KR); Seung Ryong Kim, Seoul (KR); Jong Beom Baek, Seoul (KR); Seong Hoon Park, Seoul (KR); Gyeong Nyeon Kim, Seoul (KR)

(73) Assignees: Hyundai Motor Company, Seoul (KR); Kia Corporation, Seoul (KR); KOREA UNIVERSITY RESEARCH & BUSINESS FOUNDATION, Seoul (KR)

( * ) Notice: Subject to any disclaimer, the term of this patent is extended or adjusted under 35 U.S.C. 154(b) by 277 days.

(21) Appl. No.: 18/524,690

(22) Filed: Nov. 30, 2023

(65) Prior Publication Data

US 2025/0014198 A1     Jan. 9, 2025

(30) Foreign Application Priority Data

Jul. 5, 2023     (KR) ........................ 10-2023-0087216

(51) Int. Cl.
*G06T 7/55* (2017.01)
(52) U.S. Cl.
CPC ...... *G06T 7/55* (2017.01); *G06T 2207/20021* (2013.01); *G06T 2207/20081* (2013.01); *G06T 2207/20084* (2013.01)

(58) Field of Classification Search
CPC ............ G06T 7/55; G06T 2207/20021; G06T 2207/20081; G06T 2207/20084
See application file for complete search history.

(56) References Cited

PUBLICATIONS

Hendra, Andi, and Yasushi Kanazawa. "Depth Estimation from a Single Image using Multi Stream and Scale Deep Learning." In 2019 International Conference of Advanced Informatics: Concepts, Theory and Applications (ICAICTA), pp. 1-6. IEEE, 2019. (Year: 2019).*
Jongbeom Baek et al. "MaskingDepth: Masked Consistency Regularization for Semi-supervised Monocular Depth Estimation" published on Dec. 21, 2022.
Vision Transformer (An Image is Worth 16×16 Words, Transformers for Image Recognition at Scale)—gaussian37.

* cited by examiner

*Primary Examiner* — David Perlman
(74) *Attorney, Agent, or Firm* — Banner & Witcoff, Ltd.

(57) ABSTRACT

An apparatus for estimating a depth is introduced. The apparatus may comprise a camera configured to capture an image may comprise an object, and a processor configured to perform, based on a deep learning model, a deep learning process associated with the image, obtain, based on the deep learning process associated with the image, a first depth value, obtain a partial image by masking a partial region of the image, perform, based on the deep learning model, a deep learning process associated with the partial image, obtain, based on the deep learning process associated with the partial image, a second depth value, train the deep learning model to reduce a deviation between the first depth value and the second depth value, and estimate, based on the trained deep learning model, a depth of the object.

20 Claims, 15 Drawing Sheets

VEH

110

200

APPARATUS FOR ESTIMATING A DEPTH OF IMAGE AND METHOD THEREOF

CROSS-REFERENCE TO RELATED APPLICATION

This application claims the benefit of priority to Korean Patent Application No. 10-2023-0087216, filed in the Korean Intellectual Property Office on Jul. 5, 2023, the entire contents of which are incorporated herein by reference.

TECHNICAL FIELD

The present disclosure relates to an apparatus for estimating a depth for estimating a depth and a method thereof, and more particularly, is intended to more accurately estimate the depth of an image.

BACKGROUND

An autonomous vehicle refers to a vehicle capable of being operated on its own without the manipulation of its driver or passenger. Automated vehicle & highway systems refer to a system which monitors and controls the autonomous vehicle to be operated on its own. Furthermore, technologies for monitoring the outside of the vehicle for driving assistance of the driver and operating various driving assistance may be based on the monitored environments outside the vehicle.

Operations of the automated vehicle & highway systems or the driving assistance may be controlled according to the result of monitoring the outside of the vehicle.

A camera, light detection and ranging (LiDAR), radio detection and ranging (RADAR), or the like may be used to monitor the outside of the vehicle. The camera may have the advantage of classifying external objects at low cost. However, it is difficult for a general two-dimensional (2D) camera to accurately determine a depth value because the general 2D camera includes only 2D information.

Furthermore, other than the camera of the vehicle, a technology for accurately estimating a depth value may be useful in a process of using an image in augmented reality, virtual reality, medical imaging, or the like.

To more accurately estimate the depth value, a stereo image may be used or many correct answer data should be ensured, which may be costly.

Thus, there is a need to accurately estimate a depth value from a monocular image rather than a stereo image and without using many correct answer data.

SUMMARY

According to the present disclosure, an apparatus may comprise: a camera configured to capture an image may comprise an object; and a processor configured to: perform, based on a deep learning model, a deep learning process associated with the image; obtain, based on the deep learning process associated with the image, a first depth value; obtain a partial image by masking a partial region of the image; perform, based on the deep learning model, a deep learning process associated with the partial image; obtain, based on the deep learning process associated with the partial image, a second depth value; train the deep learning model to reduce a deviation between the first depth value and the second depth value; and estimate, based on the trained deep learning model, a depth of the object.

The apparatus, wherein the processor is configured to: obtain the first depth value by performing a learning process associated with training data that is expanded based on at least one of: dimension conversion of the image; or gradation conversion of the image.

The apparatus, wherein the processor is configured to: divide the image into a plurality of patches on a patch-by-patch basis; perform, based on the plurality of patches, an encoding process for the deep learning model; determine, based on the encoding process, a first feature value; perform, based on the first feature value, a decoding process for the deep learning model; and obtain, based on the decoding process, the first depth value.

The apparatus, wherein the processor is configured to: obtain a plurality of partial images by sampling, using a mask, the partial region of the image divided on the patch-by-patch basis. The apparatus, wherein the processor is configured to use a set of masks to divide the image such that patches sampled from one of the partial images do not overlap with patches sampled from another one of the partial images.

The apparatus, wherein the processor is configured to: perform, based on the plurality of partial images, the encoding process; generate, based on the encoding process, a plurality of feature values of the plurality of partial images; obtain, based on a concatenation of the plurality of feature values, a second feature value; perform, based on the second feature value, the decoding process; and obtain, based on the decoding process, the second depth value.

The apparatus, wherein the processor is configured to: determine, based on the deviation between the first feature value and the second feature value, a magnitude of a loss function; and adjust a parameter associated with the encoding process to reduce the magnitude of the loss function.

The apparatus, wherein the processor is configured to: determine, based on the deviation between the first depth value and the second depth value, a magnitude of a loss function; and adjust a parameter of the deep learning model to reduce the magnitude of the loss function.

The apparatus, wherein the processor is configured to: determine, based on the loss function and the adjusted parameter, a degree of uncertainty of the deep learning model; and adjust, based on the degree of uncertainty, a weight of the loss function.

The apparatus, wherein the processor is configured to: obtain a first class based on the deep learning process associated with the image; obtain a second class based on the deep learning process associated with the partial image; and adjust a parameter of the deep learning model to reduce a deviation between the first class and the second class. The apparatus, wherein the processor is configured to: control, based on the estimated depth of the image, autonomous driving of a vehicle.

According to the present disclosure, a method may comprise: causing a camera to capture an image of an object; performing, based on a deep learning model, a deep learning process associated with the image; obtaining, based on the deep learning process associated with the image, a first depth value; obtaining partial images by masking a partial region of the image; performing, based on the deep learning model, a deep learning process associated with the partial images; obtaining, based on the deep learning process associated with the partial images, a second depth value; training the deep learning model to reduce a deviation between the first depth value and the second depth value; and estimating, based on the trained deep learning model, a depth of the object.

The method, wherein the obtaining the first depth value may include: performing a learning process associated with training data that is expanded based on at least one of dimension conversion of the image or gradation conversion of the image. The method, wherein the obtaining of the first depth value may include: dividing the image into a plurality of patches on a patch-by-patch basis; performing, based on the plurality of patches, an encoding process for the deep learning model; outputting, based on the encoding process, a first feature value; performing, based on the first feature value, a decoding process for the deep learning model; and obtaining, based on the decoding process, the first depth value.

The method, wherein the obtaining the partial images may include: sampling, using a mask, the partial region of the image divided on the patch-by-patch basis. The method, wherein the obtaining the partial images may include: using a set of masks to divide the image such that the plurality of patches sampled from the partial images do not overlap each other.

The method, wherein the obtaining the second depth value may include: performing, based on the partial images, the encoding process; generating, based on the encoding process, partial feature values for the partial images; outputting, based on the partial feature values, a second feature value; performing, based on the second feature value, the decoding process; and obtaining, based on the decoding process, the second depth value. The method, wherein the training of the deep learning model may include: determining, based on the deviation between the first feature value and the second feature value, a magnitude of a loss function; and adjusting a parameter associated with the encoding process to reduce the magnitude of the loss function.

The method, wherein the training of the deep learning model may include: determining, based on the deviation between the first depth value and the second depth value, a magnitude of a loss function; and adjusting a parameter of the deep learning model to reduce the magnitude of the loss function. The method, further may comprise: determining, based on the loss function and the adjusted parameter, a degree of uncertainty of the deep learning model; and adjusting, based on the degree of uncertainty, a weight of the loss function.

The method, further may comprise: obtaining a first class based on the deep learning process associated with the image; obtaining a second class based on the deep learning process associated with the partial images; and adjusting a parameter of the deep learning model to reduce a deviation between the first class and the second class.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
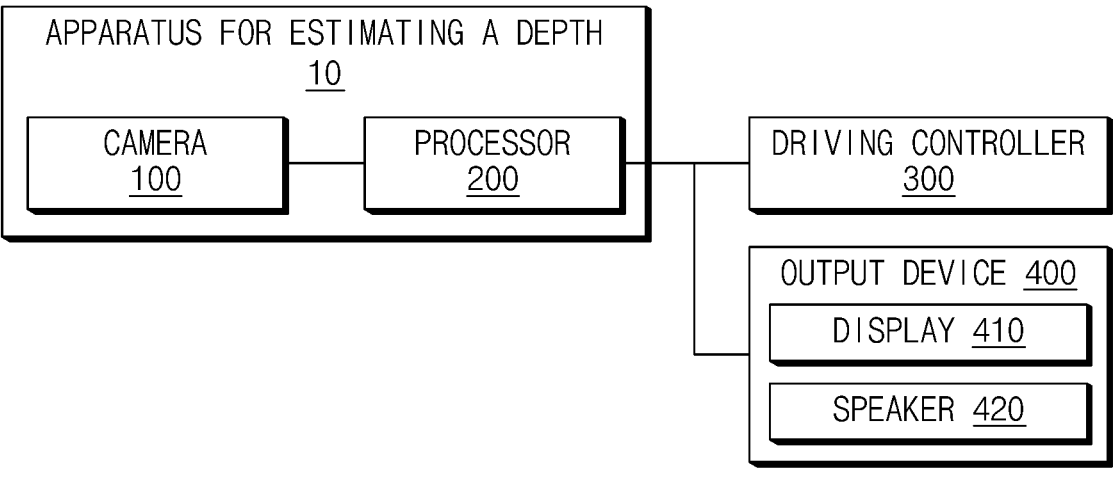
FIG. 1 shows an example of a configuration of an apparatus for estimating a depth according to an example of the present disclosure.

Hereinafter, some examples of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the example according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of this disclosure and the relevant art and will not be interpreted in an idealized or overly formal sense unless expressly so defined herein.

Hereinafter, examples of the present disclosure will be described in detail with reference to FIGS. 1 to 15.

Figure 2:
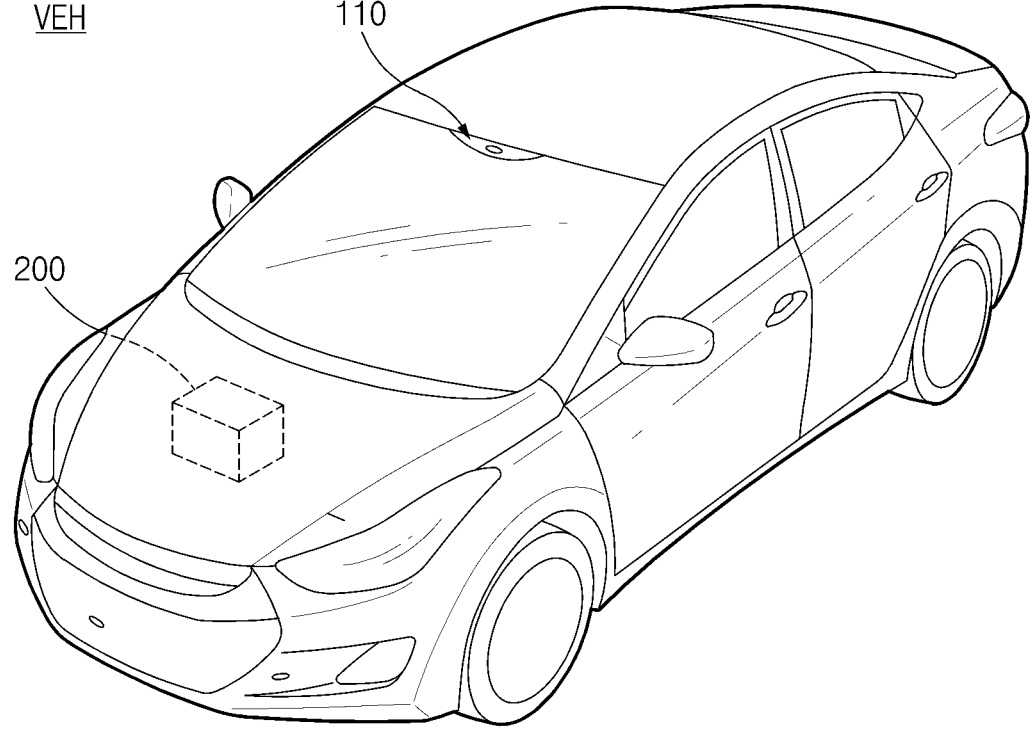
FIG. 2 shows an example of a vehicle loaded with an apparatus for estimating a depth according to an example of the present disclosure.

FIG. 1 shows an example of a configuration of an apparatus for estimating a depth according to an example of the present disclosure. FIG. 2 shows an example of a vehicle loaded with an apparatus for estimating a depth according to an example of the present disclosure. A description will be given below of an example in which the apparatus for estimating a depth is mounted on the vehicle as shown in FIG. 2, but an area where the apparatus for estimating a depth is able to be used is not limited thereto.

Referring to FIGS. 1 and 2, an apparatus for estimating a depth OD according to an example of the present disclosure may include a camera 110 and a processor 200.

The camera 110 may obtain an external image of the vehicle, which may be disposed adjacent to a front wind shield or may be disposed around a front bumper or a radiator grille. The external image may be expressed on a two-dimensional (2D) image plane, and respective pixels of the image plane may be expressed as image coordinates.

The processor 200 may use a deep learning model for classifying an object on the external image obtained by the camera 110. The deep learning model may be included in the processor 200 or may be stored in an external memory (not shown). The deep learning model may use a vision transformer. The vision transformer may use a sequence of image patches as an input without relying on convolutional neural networks (CNN).

The processor 200 may include one or more artificial intelligence (AI) processors such as the deep learning model. The AI processor may train a neural network using a previously stored program. The neural network for a target vehicle and a dangerous vehicle may include a plurality of network nodes having weights, which may be designed to simulate a human brain structure on the computer and may simulate neurons of the human neural network. The plurality of network nodes may transmit and receive data depending on each connection relationship to simulate the synaptic activity of neurons which transmit and receive signals through the synapse. The neural network may include a deep learning model developed from a neural network model. The plurality of network nodes in the deep learning model may be located on different layers to transmit and receive data depending on a convolution connection relationship. An example of the deep learning model may include various deep learning techniques such as deep neural networks (DNN), convolutional deep neural networks (CNN), a recurrent neural network (RNN), a restricted Boltzmann machine (RBM), deep belief networks (DBN), and a deep Q-network. Especially, the processor 200 may include a Vision Transformer for learning an image.

To this end, the processor 200 may include a memory for storing an algorithm and an AI processor. The memory may use a hard disk drive, a flash memory, an electrically erasable programmable read-only memory (EEPROM), a static random access memory (SRAM), a ferro-electric RAM (FRAM), a phase-change RAM (PRAM), a magnetic RAM (MRAM), a dynamic RAM (DRAM), a synchronous DRAM (SDRAM), a double date rate-SDRAM (DDR-SDRAM), or the like.

Particularly, the processor 200 according to an example of the present disclosure may train the deep learning model such that the results of learning an original image obtained by the camera 110 and partial images obtained by masking a portion of the original image are similar to each other, thus more accurately obtaining a depth value. To this end, the processor 200 may obtain a first depth value based on learning the image using the deep learning model. Furthermore, the processor 200 may obtain a partial image by masking a partial region of the image and may obtain a second depth value based on learning the partial image. Furthermore, the processor 200 may train the deep learning model to reduce a deviation between the first depth value and the second depth value.

Furthermore, the processor 200 may control a driving controller 300 based on a scenario determined according to the detected object. For example, if the detected object is an obstacle which interferes with the driving of the vehicle, the processor 200 may control the driving of the vehicle to avoid the obstacle.

The driving controller 300 may control the driving of the vehicle in response to a control signal from the processor 200, which may include a steering controller, an engine controller, a braking controller, and a transmission control module. The driving controller 300 is not limited to a device mounted on the vehicle which travels depending on autonomous driving levels defined by the Society of Automotive Engineers, which may be a meaning of being collectively referred to as a driving assistance device for increasing the convenience of the user under control of the processor 200.

The steering controller may be divided into a hydraulic power steering (HPS) system for controlling steering using hydraulic pressure formed by a hydraulic pump and a motor driven power steering system (MDPS) for controlling steering using the output torque of an electric motor.

The engine controller is an actuator for controlling the engine of the vehicle, which controls acceleration of the vehicle. The engine controller may be implemented as an engine management system (EMS). The engine controller controls driving torque of the engine depending on accelerator pedal position information output from an accelerator pedal position sensor. The engine controller controls engine power for following the driving speed of the vehicle requested from the processor 200 during autonomous driving.

The braking controller is an actuator for controlling the deceleration of the vehicle, which may be implemented as electronic stability control (ESC). The braking controller controls braking pressure for following a target speed requested from the processor 200. In other words, the braking controller controls the deceleration of the vehicle.

The transmission control module is an actuator for controlling the transmission of the vehicle, which may be implemented as shift by wire (SBW). The transmission control module controls a gear shift of the vehicle depending on a gear position and a gear state range.

An output device 400 may output information about the object detected based on the image under control of the processor 200, which may include a display 410 and a speaker 420. The processor 200 may visually express the detected object on the display 410. Furthermore, the processor 200 may output a warning sound if detecting an obstacle capable of endangering safety through the speaker 420.

A description will be given in detail of the structure and operation of the processor 200.

Figure 3:
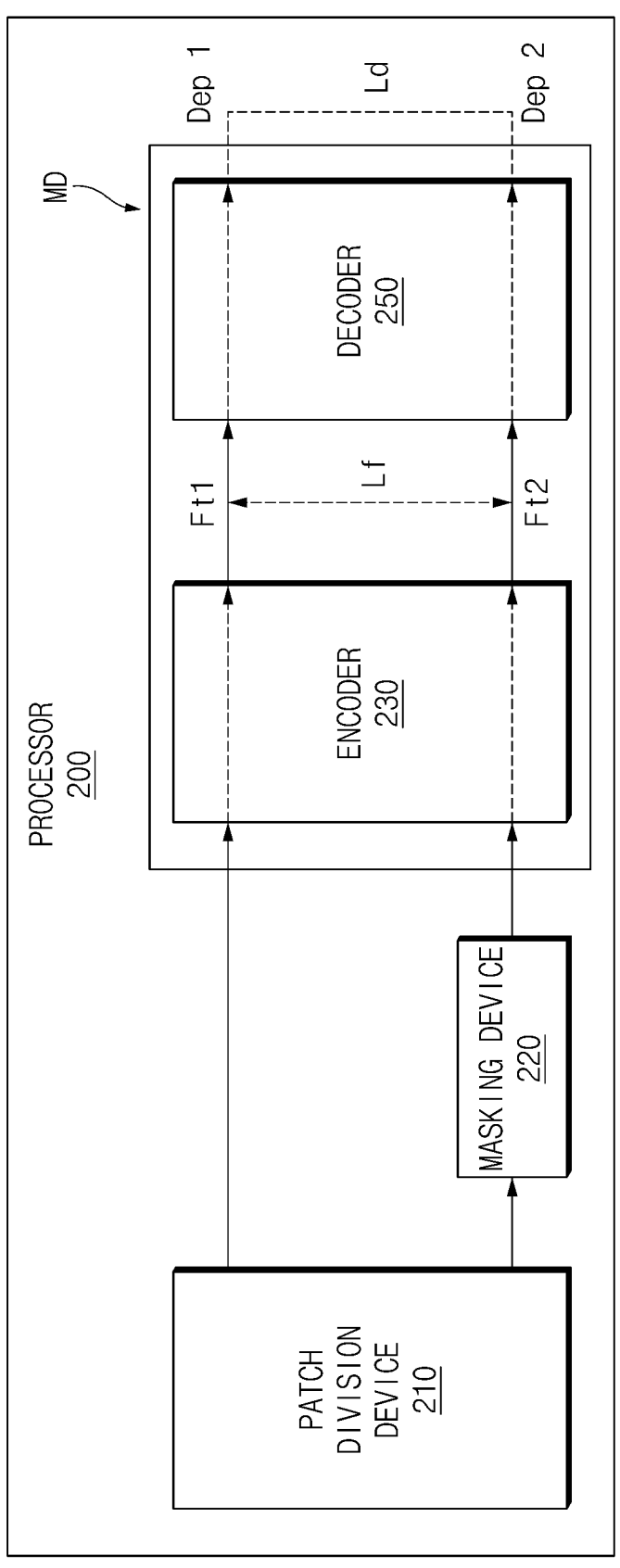
FIG. 3 shows an example of a configuration of a processor according to an example of the present disclosure.
Figure 4:
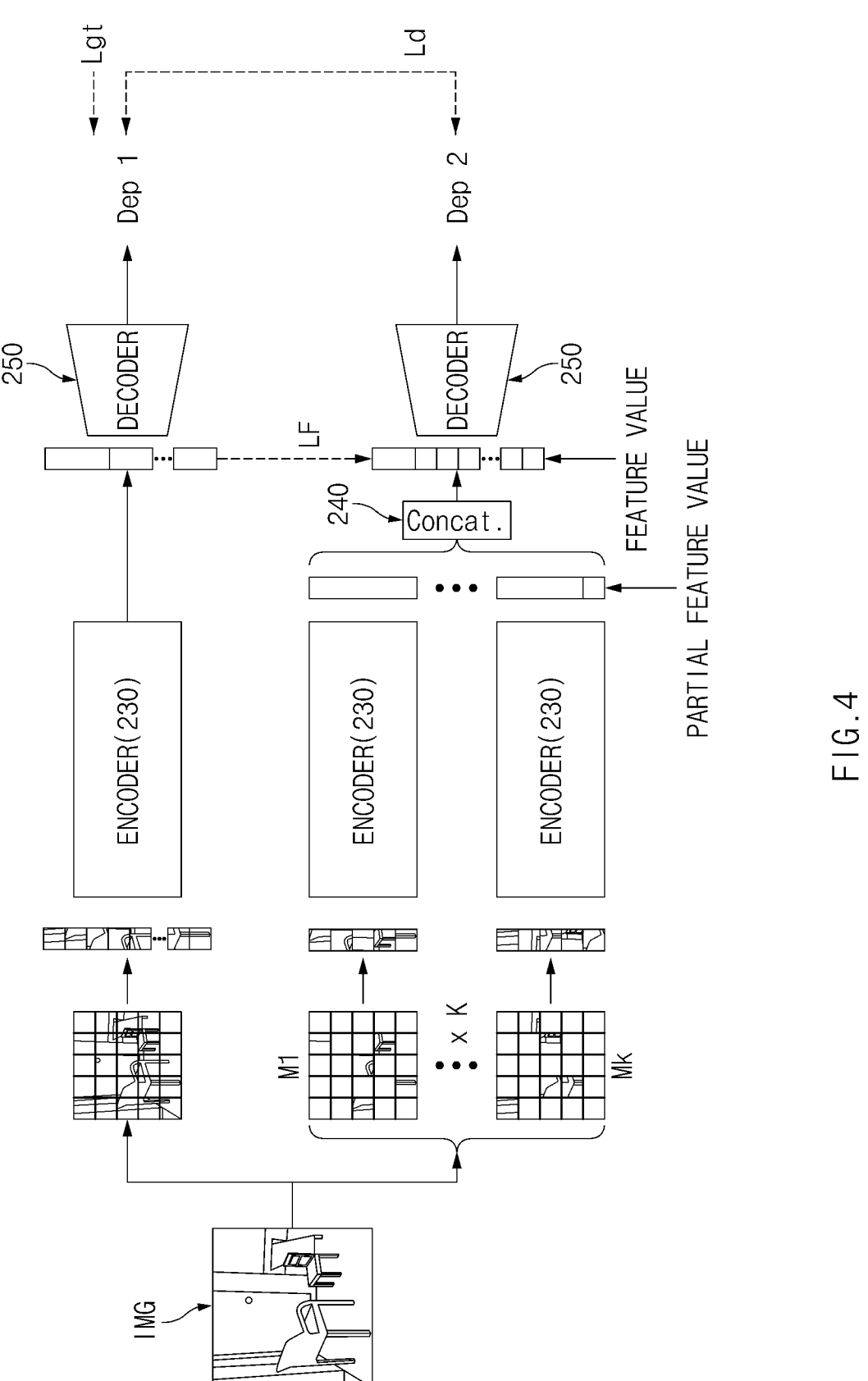
FIG. 4 shows an example of a deep learning operation of a processor according to an example of the present disclosure.

FIG. 3 shows an example of a configuration of a processor according to an example of the present disclosure. FIG. 4 shows an example of a deep learning operation of a processor according to an example of the present disclosure.

Referring to FIGS. 3 and 4, a processor 200 according to an example of the present disclosure may include a patch division device 210, a masking device 220, and a deep learning model MD. The deep learning model MD may include an encoder 230, a concatenator 240, and a decoder 250.

The patch division device 210 may divide an image IMG on a patch-by-patch basis to generate a plurality of patches. The image IMG may refer to image data obtained by a camera 110.

The masking device 220 may generate partial images corresponding to the number of a plurality of masks M_1 to M_k using the plurality of masks M_1 to M_k. The masking device 220 may generate a partial image in a manner which remove some of the patches and leaves the sampled patches. The patches sampled from the respective partial images may fail to overlap each other.

The encoder 230 may receive an image on a patch-by-patch basis, may learn the patches, and may extract feature values. The encoder 230 may learn the patches of the entire image and may extract a first feature value Ft1. Furthermore, the encoder 230 may learn partial images generated by the masking device 220 and may generate partial feature values for the respective partial images.

The concatenator 240 may concatenate the partial feature values to generate a second feature value Ft2.

The processor 200 may train the deep learning model MD using a first loss function Lf. The first loss function Lf may be a function, a magnitude of which is determined according to a deviation between the first feature value Ft1 and the second feature value Ft2. The processor 200 may adjust a parameter of the encoder 230 such that the first loss function Lf becomes smaller in magnitude.

The decoder 250 may extract a first depth value Dep1 based on the first feature value Ft1 and may extract a second depth value Dep2 based on the second feature value Ft2.

The processor 200 may train the deep learning model MD using a second loss function Ld. The second loss function Ld may be a function, a magnitude of which is determined according to a deviation between the first depth value Dep1 and the second depth value Dep2. The processor 200 may adjust parameters of the encoder 230 and the decoder 250 such that the second loss function Ld becomes smaller in magnitude.

Figure 5:
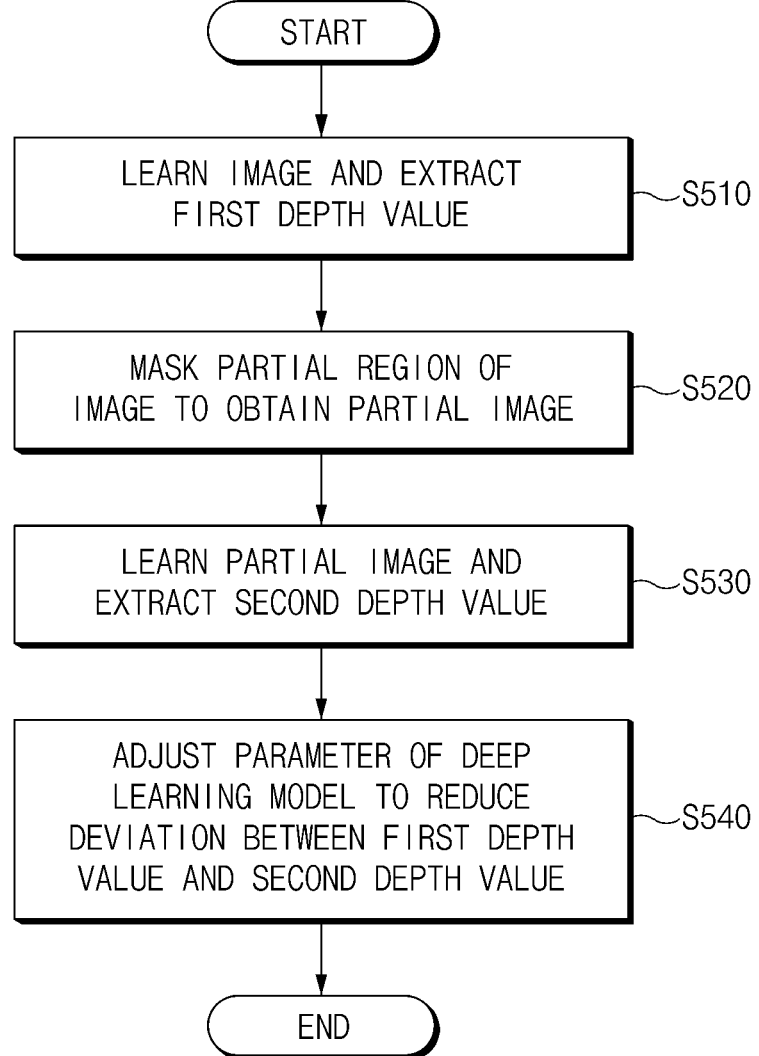
FIG. 5 shows an example of a depth estimating method according to an example of the present disclosure.

FIG. 5 shows an example of a depth estimating method according to an example of the present disclosure. A description will be given of the depth estimating method according to an example of the present disclosure with reference to FIG. 5.

In S510, a processor 200 may obtain a first depth value based on learning an image using a deep learning model MD.

To this end, an encoder 230 of the deep learning model MD may receive image patches generated by a patch division device 210. The encoder 230 may learn the image patches and may extract a first feature value Ft1. Furthermore, a decoder 250 may extract a first depth value Dep1 based on a first feature value Ft1.

The first depth value Dep1 may be the result of learning training data expanded based on the image. For example, the processor 200 may generate training data expanded based on dimension conversion of the image or gradation conversion of the image and may learn the expanded training data to extract the first depth value Dep1.

In S520, the processor 200 may obtain a partial image by masking a partial region of the image.

A masking device 220 may sample and leave some patches from the image patch generated by the patch division device 210 and may remove patches except for the sampled patches to generate a partial image. The masking device 220 may generate a partial image using a plurality of predetermined masks.

In S530, the processor 200 may obtain a second depth value Dep2 based on learning the partial image.

The encoder 230 may learn the partial images generated by the masking device 220 and may generate partial feature values. A concatenator 240 may concatenate the partial feature values to generate a second feature value Ft2.

The processor 200 may correct a parameter of the encoder 230 to reduce a deviation between the first feature value Ft1 and the second feature value Ft2. To this end, the processor 200 may use a first loss function Lf proportional to the deviation between the first feature value Ft1 and the second feature value Ft2. The processor 200 may adjust a parameter of the encoder 230 such that the first loss function Lf becomes smaller in magnitude.

In S540, the processor 200 may train the deep learning model MD to reduce a deviation between the first depth value Dep1 and the second depth value Dep2.

To this end, the processor 200 may use a second loss function Ld proportional to the deviation between the first depth value Dep1 and the second depth value Dep2. The processor 200 may adjust a parameter of the encoder 230 and a parameter of the decoder 250 such that the second loss function Ld becomes smaller in magnitude.

Furthermore, the first depth value Dep1 output by the decoder 250 may be the result of being learned using a third loss function Lgt for reducing a deviation with an actual depth value. In other words, the processor 200 may adjust the parameter of the encoder 230 and the parameter of the decoder 250 to reduce a magnitude of the third loss function Lgt proportional to a deviation between the first depth value Dep1 and the actual depth value.

Hereinafter, a description will be given of a detailed example for respective procedures.

Figure 6:
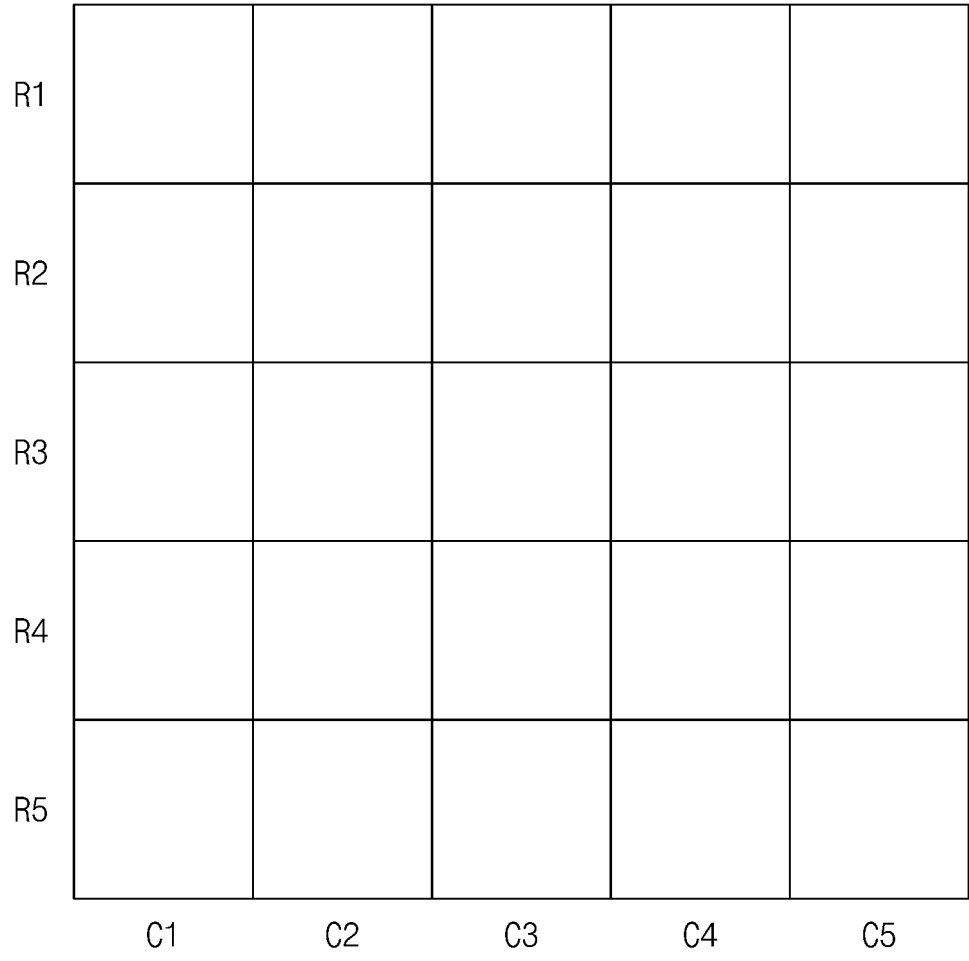
FIG. 6 shows an example of image patches.

FIG. 6 shows an example of image patches.

Referring to FIG. 6, a patch division device 210 may divide an image into a plurality of patches. FIG. 6 shows an example of respectively dividing an image in the direction of a row and the direction of a column by five to generate 25 patches.

The number of the patches may be a value obtained by dividing a size of the image by a size p of the patch. For example, the image may be expressed with a channel C, a height H, and a width W such as (C, H, W). If the image is expressed as (3, 256, 256), and if the patch size is set to 16 to divide the image, the size of each of the image patches may be (3, 16, 16) and the number of the image patches may be 16×16.

Figure 7:
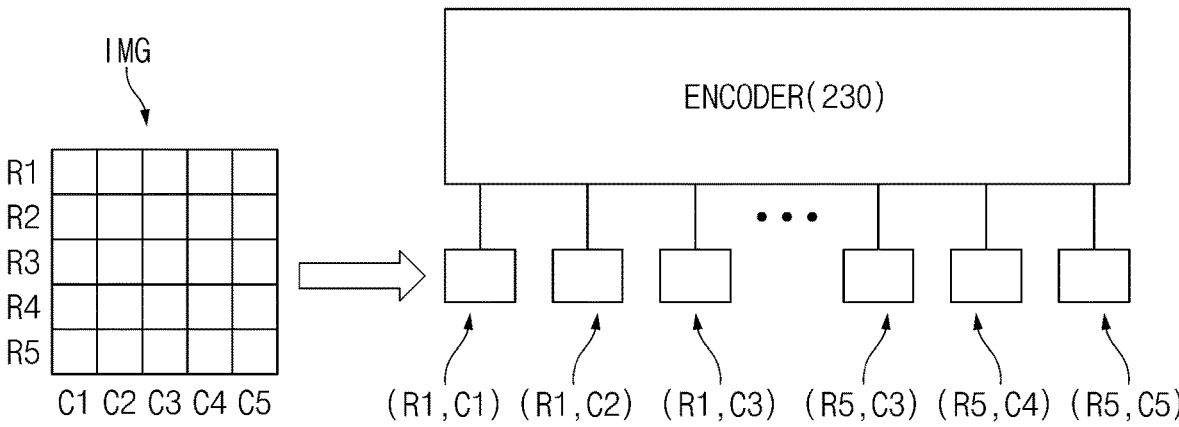
FIG. 7 shows an example of providing an encoder with image patches as sequence data.

FIG. 7 shows an example of providing an encoder with image patches as sequence data. FIG. 7 shows an example of providing an encoder with an input value for obtaining a first feature value.

Referring to FIG. 7, a processor 200 may provide an encoder 230 with image patches as sequence data.

For example, the processor 200 may arrange patches from a left upper end of the image to a right lower end of the image in order to generate sequence data. For example, the processor 200 may arrange patches in a first row as (R1, C1), (R1, C2), (R1, C3), (R1, C4), and (R1, C5). Next, the processor 200 may arrange patches in a second row in order of column. The processor 200 may arrange patches in the last row as (R5, C1), (R5, C2), (R5, C3), (R5, C4), and (R5, C5) in such a manner.

Then, the processor 200 may flatten and convert the respective patches into a vector.

If there are 3 channels and the number of patches is 16×16, the size of a vector may be 3×16×16 and the number of vectors may be 16×16. Next, the sequence data may be expressed as (256, 768).

The processor 200 may perform linear calculation of the respective vectors and may proceed with an embedding procedure. Next, the processor 200 may add a class token for predicting a class to the result of proceeding with the embedding procedure.

Furthermore, the processor 200 may add positional embedding to an input value of the encoder 230 to store position information of each of the patches.

The encoder 230 may extract a first feature value, based on the sequence data generated based on all the patches of the image.

Furthermore, an image IMG for extracting the first feature value may be expanded by means of data augmentation. In other words, the deep learning model MD may learn training data variously changed by means of the data augmentation, thus increasing depth estimating performance. A description will be given of the data augmentation with reference to FIG. 8.

Figure 8:
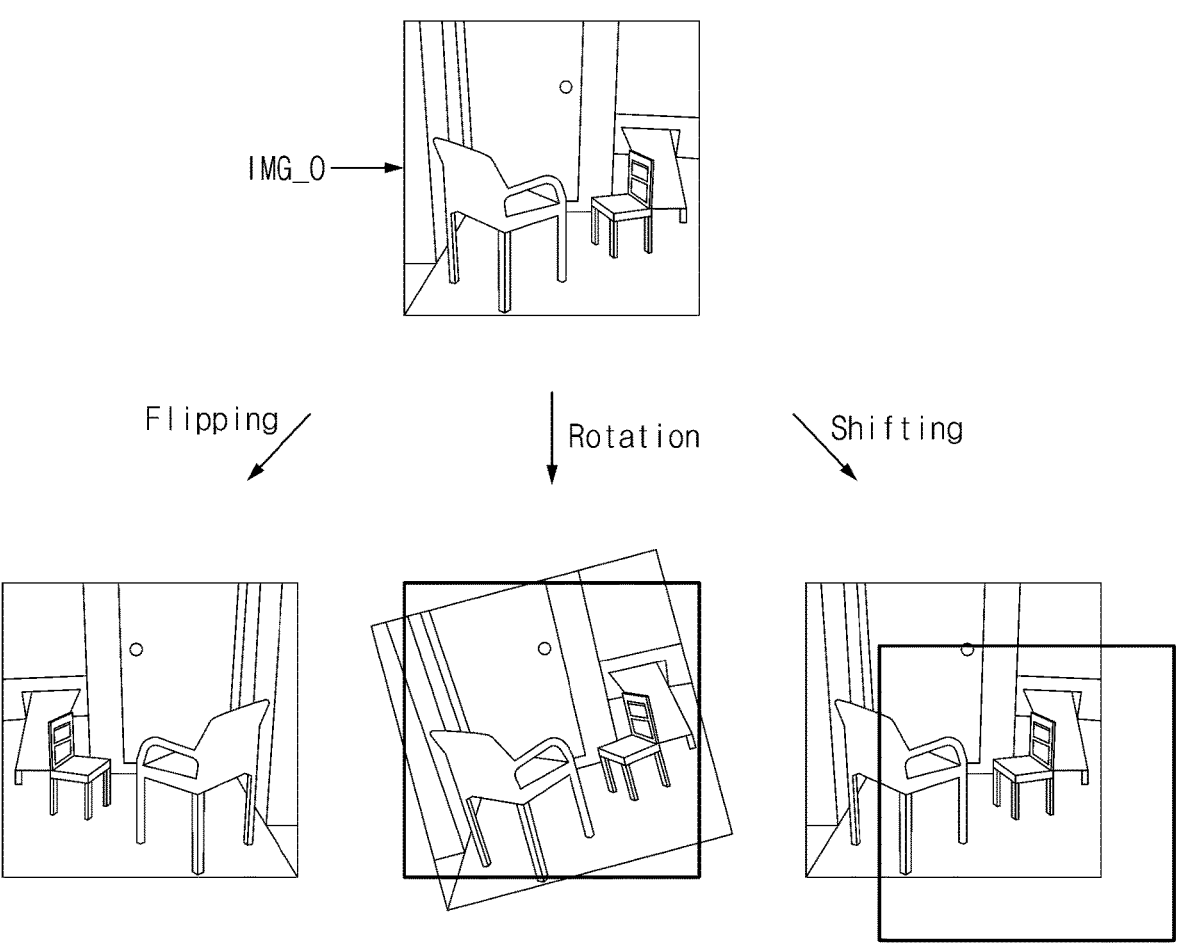
FIG. 8 shows an example of data augmentation used in a process of extracting a first feature value.

FIG. 8 shows an example of data augmentation used in a process of extracting a first feature value.

As shown in FIG. 8, a processor 200 may expand training data using a flipping technique for reversing an image IMG.

Furthermore, the processor 200 may rotate the image IMG in a z-axis direction to expand training data. The z-axis direction may refer to an axis perpendicular to a 2D plane of the image.

Furthermore, the processor 200 may expand training data in a shifting technique for shifting respective pixels of the image IMAG by the same position.

The training data generated using the data augmentation shown in FIG. 8 may maintain a feature of the image IMG.

Other than the scheme shown in FIG. 8, the processor 200 may randomly add white noise to the entire region of the image or may randomly add black noise to the entire region of the image, thus generating reinforced training data. As such, the training data generated by adding the noise may also maintain the feature of the image IMG.

A deep learning model MD may increase the accuracy of a first feature value Ft1 using the expanded training data for maintaining the feature of the image IMG.

Figure 9:
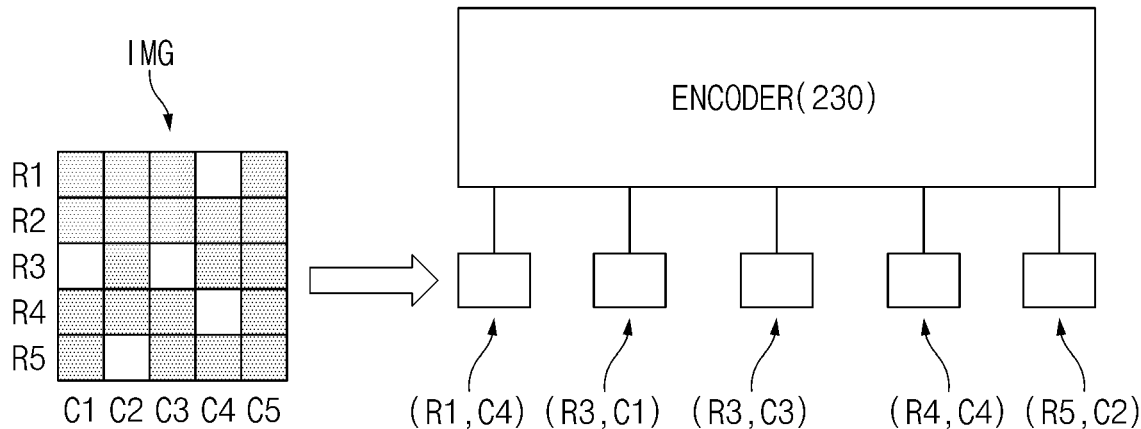
FIG. 9 shows another example of providing an encoder with image patches as sequence data.

FIG. 9 shows another example of providing an encoder with image patches as sequence data. FIG. 9 shows an example of providing an encoder with an input value for obtaining a second feature value.

Referring to FIG. 9, a processor 200 may provide an encoder 230 with patches of a partial image as sequence data.

The partial image shown in FIG. 9 illustrates a case where patches of (R1, C4), (R3, C1), (R3, C3), (R4, C4), and (R5, C2) are sampled and patches except for the sampled patches are removed.

The processor 200 may arrange patches from a left upper end of the partial image to a right lower end of the partial image in order to generate sequence data. For example, the processor 200 may arrange patches sampled in an order of (R1, C4), (R3, C1), (R3, C3), (R4, C4), and (R5, C2).

Next, the processor 200 may flatten and convert the sampled patches into a vector.

The processor 200 may perform linear calculation of the respective vectors and may proceed with an embedding procedure.

Furthermore, the processor 200 may add positional embedding to an input value of the encoder 230 to store position information of each of the patches.

Figure 10:
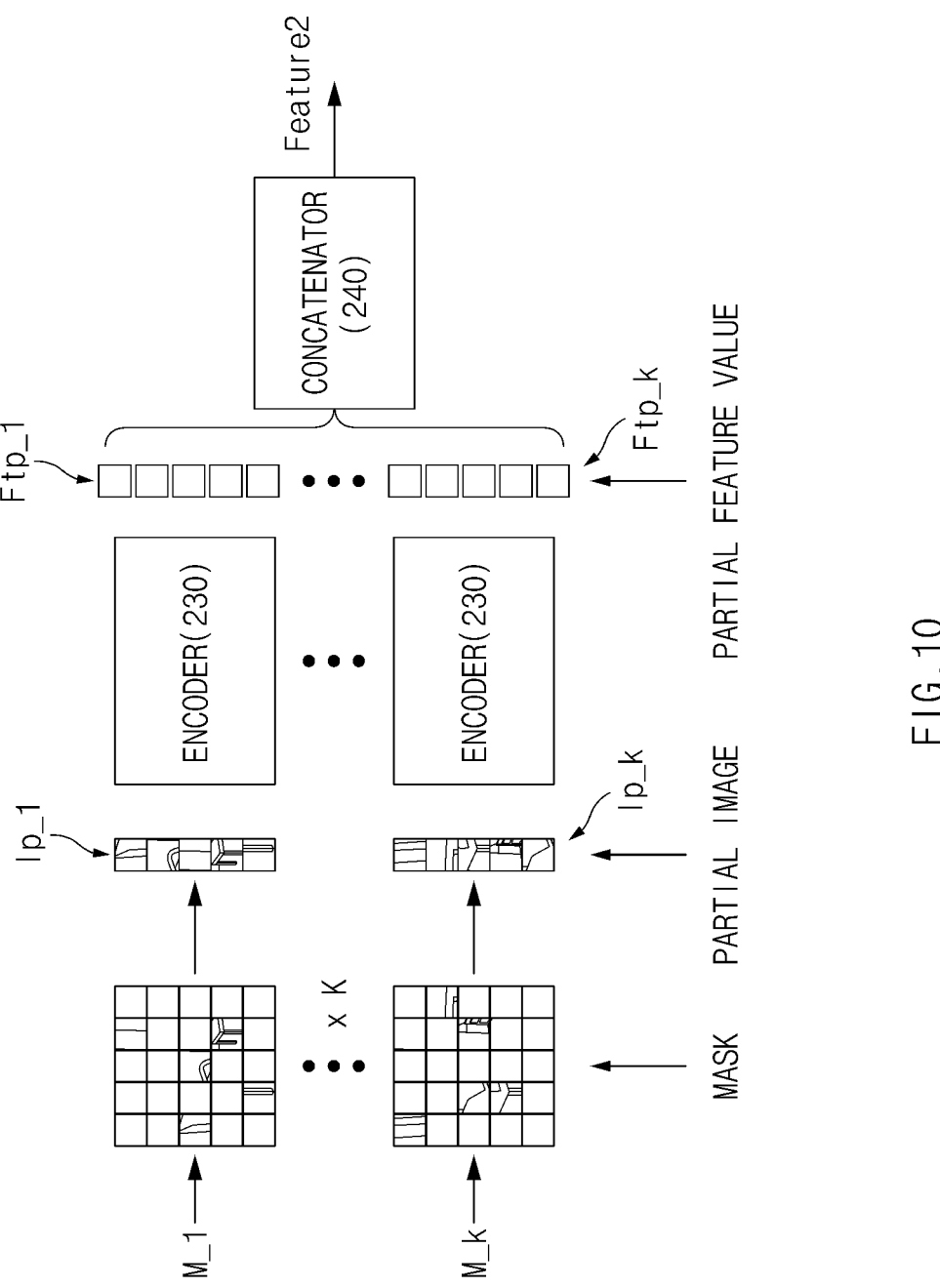
FIG. 10 shows an example of a process of extracting a second feature value using an encoder.

FIG. 10 shows an example of a process of extracting a second feature value using an encoder.

Referring to FIG. 10, encoders 230 of a transformer may learn partial images Ip_1 to Ip_k to generate partial feature values. The partial images Ip_1 to Ip_k may be generated using masks M_1 to M_k by a masking device 220.

The masking device 220 may generate first to kth partial images Ip_1 to Ip_k using first to kth (where k is a natural number) masks M_1 to M_k.

If the image includes n patches and each of the first to kth masks M_1 to M_k samples i (where i is a natural number) patches, the number k of masks may be "n/i".

Next, the patches sampled from the respective partial images Ip_1 to Ip_k may fail to overlap each other. For example, a patch of position (R1, C4), which is sampled from the first partial image Ip_1, may fail to be included in other partial images.

Patches included in the respective partial images Ip_1 to Ip_k may be provided to the encoder 230 based on pieces of embedded position information as described above.

The encoder 230 may learn the first partial image Ip_1 to extract a first partial feature value Ftp_1 and may repeat the same manner to learn the kth partial image Ip_k to extract the kth partial feature value Ftp_k.

It may be difficult to estimate information of the entire image based on the respective partial feature values Ftp_1 to Ftp_k. Thus, a procedure for estimating a feature value of the entire image based on the respective partial feature values Ftp_1 to Ftp_k may be added. To this end, the first to kth partial feature values Ftp_1 to Ftp_k may be provided to a concatenator 240.

The concatenator 240 may concatenate partial feature values using pieces of position information of the first to kth partial feature values Ftp_1 to Ftp_k to generate a second feature value.

As a result, a deep learning model MD may learn the partial images Ip_1 to Ip_k to obtain the second feature value for the entire image.

Figure 11:
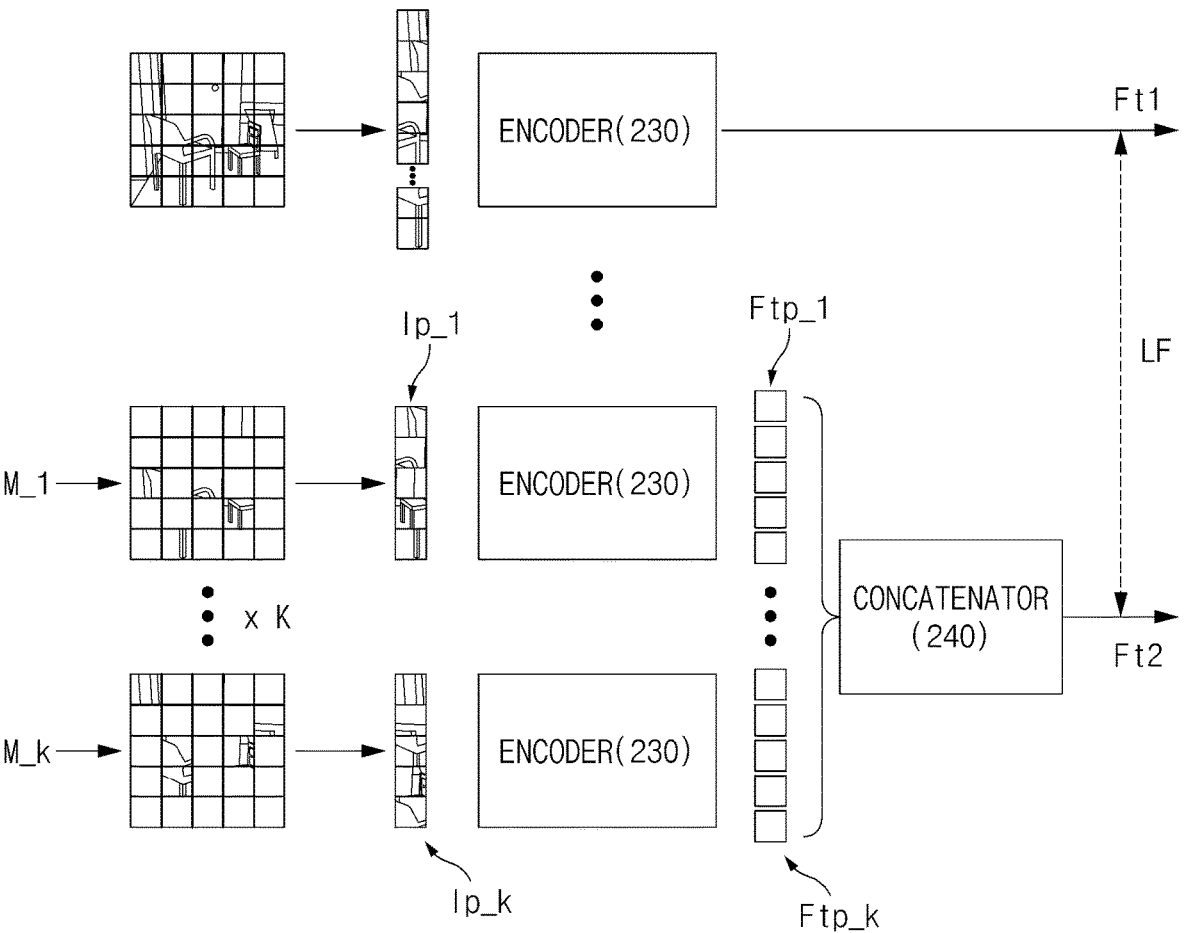
FIG. 11 shows an example of a scheme which trains an encoder based on a first loss function.
Figure 12:
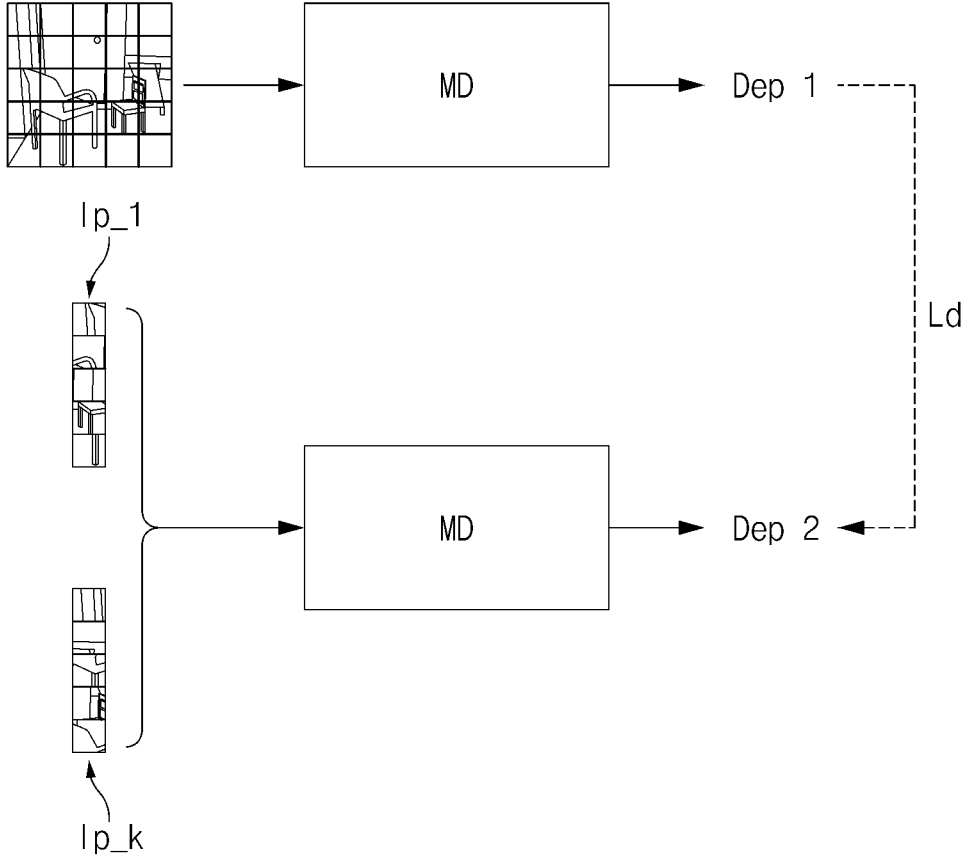
FIG. 12 shows an example of training a deep learning model based on a second loss function.

FIG. 11 shows an example of a scheme which trains an encoder based on a first loss function. FIG. 12 shows an example of training a deep learning model based on a second loss function.

Referring to FIG. 11, an encoder 230 according to an example of the present disclosure may learn patches of an image IMG to extract a first feature value Ft1.

Furthermore, the encoder 230 may learn partial images Ip_1 to Ip_k where a portion of the image IMG is removed to extract partial feature values Ftp_1 to Ftp_k. A concatenator 240 may concatenate the partial feature values Ftp_1 to Ftp_k to obtain a second feature value Ft2.

A processor 200 may adjust a parameter of the encoder 230 using a first loss function Lf. The first loss function Lf may derive a larger value in proportion to a deviation between the first feature value Ft1 and the second feature value Ft2. The processor 200 may calculate the first loss function Lf based on the first feature value Ft1 and the second feature value Ft2. Next, the processor 200 may adjust parameters of the encoder 230 to reduce a magnitude of the first loss function Lf. The parameters of the encoder 230 may be factors for determining a feature value derived based on the image or the partial image.

The first feature value Ft1 may be the result of learning the entire image and may be the result of additionally learning training data where the feature of the image is maintained by means of image augmentation.

The second feature value Ft2 may be a value obtained by concatenating the results of learning the partial image where a portion of the image is omitted. Thus, the second feature value Ft2 may be the result of learning the partial image where the feature of the image is omitted.

In other words, a deep learning model MD according to an example of the present disclosure may proceed with learning in the direction of making the first feature value Ft1 derived from the training data where the feature of the image is maintained and the second feature value Ft2 derived from the partial image where the feature of the image is able to be omitted be identical to each other. Thus, the deep learning model MD according to an example of the present disclosure may increase image learning performance even using the data where the feature of the object is omitted as a portion of the image is omitted and may generate a feature value capable of more accurately deriving a depth value of the image.

Referring to FIG. 12, the deep learning model MD according to an example of the present disclosure may learn patches of an image IMG to extract a first depth value Dep1.

Furthermore, the deep learning model MD may learn partial images Ip_1 to Ip_k where a portion of the image IMG is deleted to obtain a second depth value Dep2.

The processor 200 may adjust parameters of the deep learning model MD using a second loss function Ld. For example, the processor 200 may adjust parameters of the encoder 230 and a decoder 250 to reduce a magnitude of the second loss function Ld. The parameters of the encoder 230 and the decoder 250 may be factors for determining a depth value derived based on the image or the partial image.

The first depth value Dep1 may be the result of learning the entire image and may be the result of additionally learning training data where the feature of the image is maintained by means of image augmentation. The second depth value Dep2 may be a value obtained by concatenating the results of learning the partial image where a portion of the image is omitted. Thus, the second depth value Dep2 may be the result of learning the partial image where the feature of the image is omitted.

In other words, the deep learning model MD according to an example of the present disclosure may proceed with learning in the direction of making the first depth value Dep1 derived from the training data where the feature of the image is maintained and the second depth value Dep2 derived from the partial image where the feature of the image is able to be omitted be identical to each other. Thus, the deep learning model MD according to an example of the present disclosure may increase image learning performance even using the data where the feature of the object is omitted as a portion of the image is omitted and may more accurately extract a depth value of the image.

Figure 13:
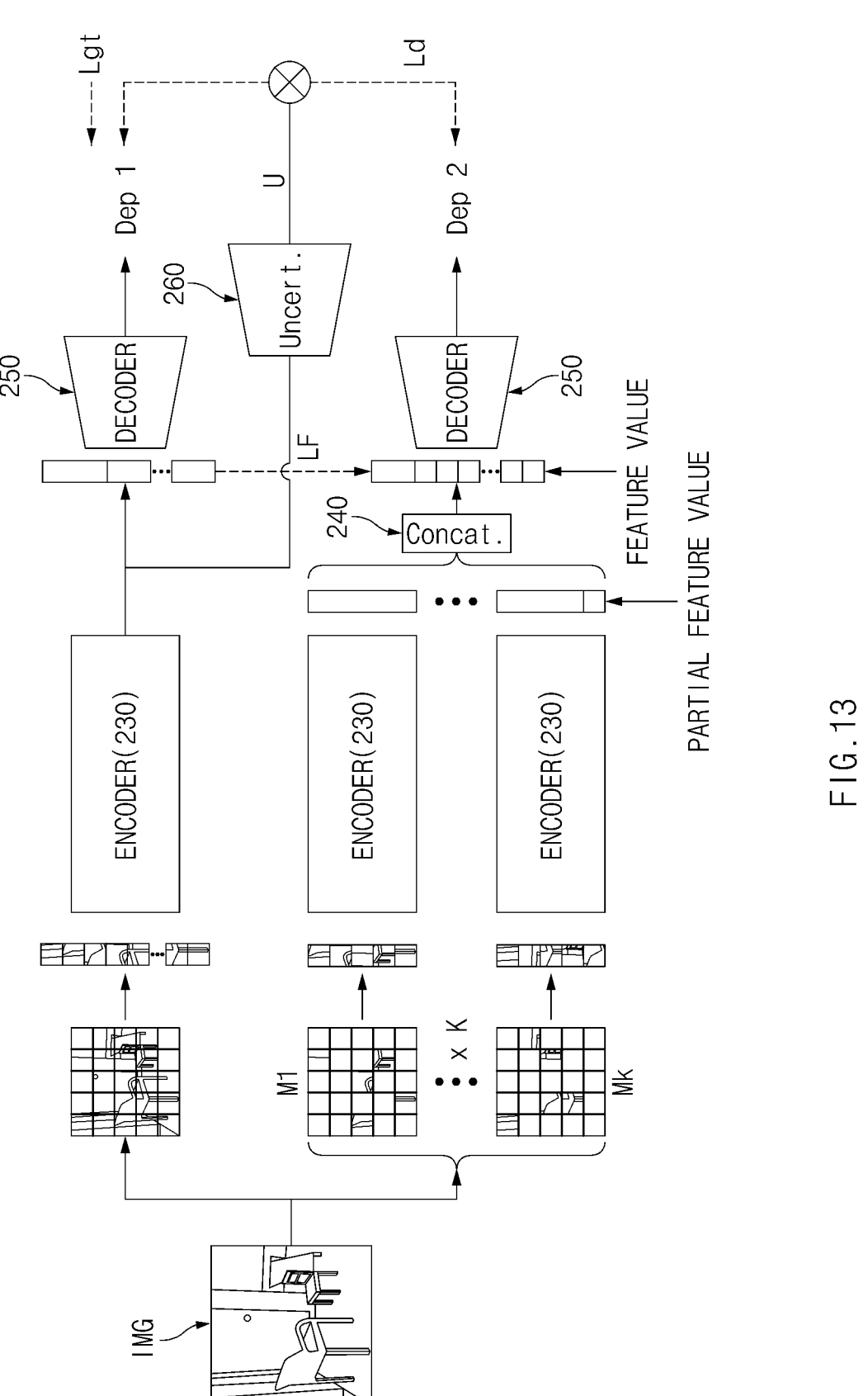
FIG. 13 shows an example of a deep learning operation of a processor according to another example of the present disclosure.

FIG. 13 shows an example of a deep learning operation of a processor according to another example of the present disclosure.

Referring to FIGS. 13, a processor 200 according to an example of the present disclosure may include a patch division device 210, a masking device 220, and a deep learning model MD. The deep learning model MD may use a vision transformer, which may include an encoder 230, a concatenator 240, a decoder 250, and a confidence level determination device 260. A detailed description of substantially the same configuration as the above-mentioned example in the example of FIG. 13 will be omitted.

The processor 200 may train a deep learning model MD using a first loss function Lf. The first loss function Lf may be a function, a magnitude of which is determined according to a deviation between a first feature value Ft1 and a second feature value Ft2. The processor 200 may adjust a parameter of the encoder 230 such that the first loss function Lf becomes smaller in magnitude.

The decoder 250 may extract a first depth value based on the first feature value and may extract a second depth value based on the second feature value.

The processor 200 may train the deep learning model MD using a second loss function Ld. The second loss function Ld may be a function, a magnitude of which is determined according to a deviation between the first depth value and the second depth value. The processor 200 may adjust parameters of the encoder 230 and the decoder 250 such that the second loss function Ld becomes smaller in magnitude.

The confidence level determination device 260 may determine a degree U of uncertainty of the deep learning model MD trained to reduce the second loss function Ld and may adjust the second loss function Ld depending on the degree U of uncertainty. For example, the confidence level determination device 260 may determine the degree U of uncertainty on a pixel-by-pixel basis or on a patch-by-patch basis and may reflect the degree U of uncertainty to adjust a weight for any pixel or any patch in the second loss function Ld.

The confidence level determination device 260 may adjust the second loss function Ld depending on the degree of uncertainty to reduce a phenomenon in which the accuracy of the extracted depth value is reduced although the second loss function Ld is reduced.

Figure 14:
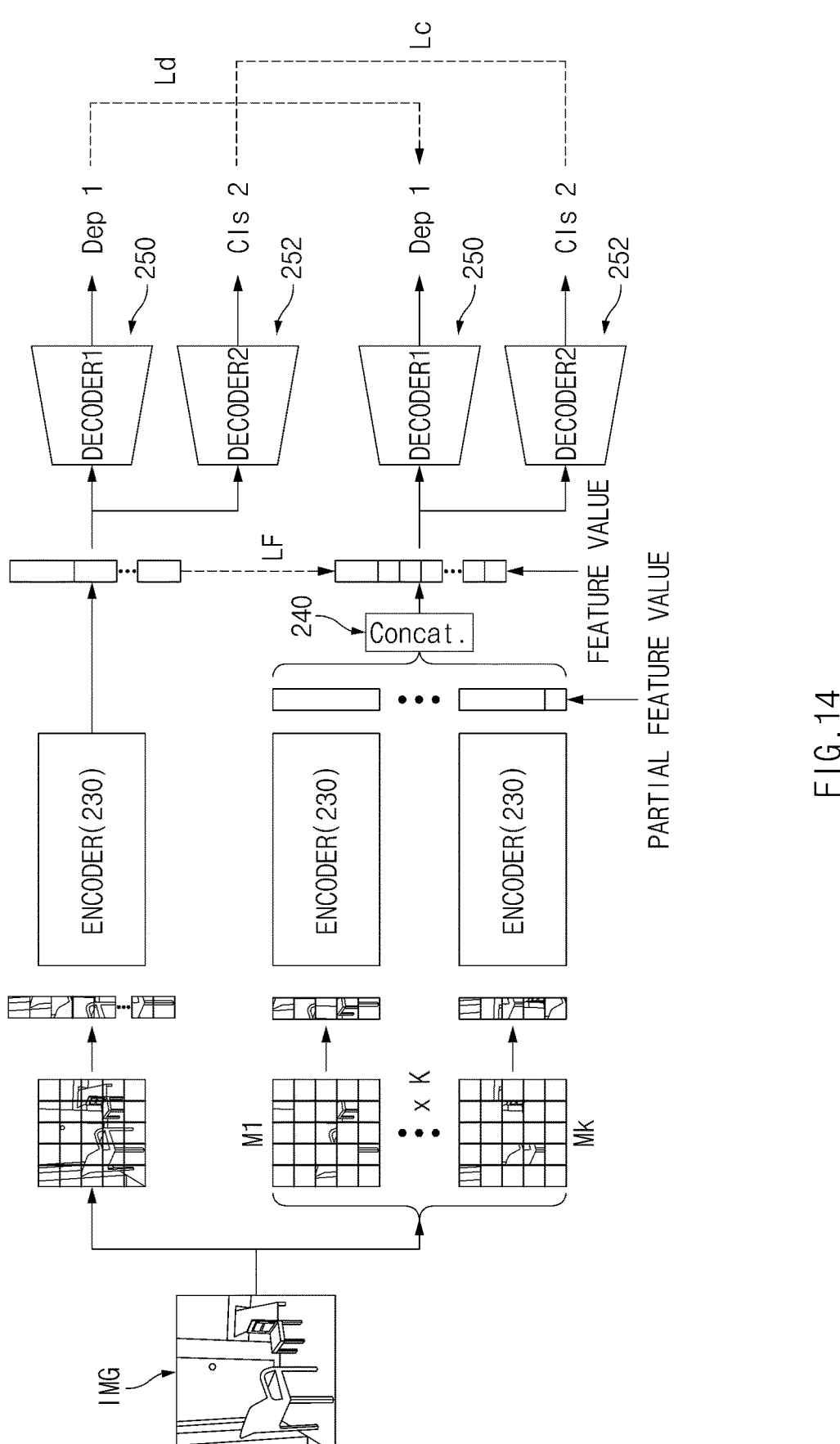
FIG. 14 is a diagram for describing a deep learning operation according to another example of the present disclosure.

FIG. 14 shows an example of a deep learning operation according to another example of the present disclosure.

Referring to FIGS. 14, a processor 200 according to an example of the present disclosure may include a patch division device 210, a masking device 220, and a deep learning model MD. The deep learning model MD may use a vision transformer, which may include an encoder 230, a concatenator 240, a first decoder 250, and a second decoder 252. A detailed description of substantially the same configuration as the above-mentioned example in the example of FIG. 14 will be omitted.

The processor 200 may train a deep learning model MD using a first loss function Lf. The first loss function Lf may be a function, a magnitude of which is determined according to a deviation between a first feature value and a second feature value. The processor 200 may adjust a parameter of the encoder 230 such that the first loss function Lf becomes smaller in magnitude.

The first decoder 250 may extract a first depth value Dep1 based on the first feature value and may extract a second depth value Dep2 based on the second feature value. The processor 200 may train the deep learning model MD using a second loss function Ld. The second loss function Ld may be a function, a magnitude of which is determined according to a deviation between the first depth value Dep1 and the second depth value Dep2. The processor 200 may adjust parameters of the encoder 230 and the decoder 250 such that the second loss function Ld becomes smaller in magnitude.

The second decoder 252 may extract a first class Cls1 based on the first feature value and may extract a second class Cls2 based on the second feature value. The processor 200 may train the deep learning model MD using a fourth loss function Lc. The fourth loss function Lc may be a function, a magnitude of which is determined according to a deviation between the first class Cls1 and the second class Cls2. The processor 200 may adjust parameters of the encoder 230 and the decoder 250 such that the fourth loss function Lc becomes smaller in magnitude.

The first class Cls1 may be the result of learning the entire image and may be the result of additionally learning training data where the feature of the image is maintained by means of image augmentation. The second class Cls2 may be a value obtained by concatenating the results of learning the partial image where a portion of the image is omitted. Thus, the second class Cls2 may be the result of learning the partial image where the feature of the image is omitted.

In other words, the deep learning model MD according to an example of the present disclosure may proceed with learning in the direction of making the first class Cls1 derived from the training data where the feature of the image is maintained and the second class Cls2 derived from the partial image where the feature of the image is able to be omitted be identical to each other. Thus, the deep learning model MD according to an example of the present disclosure may increase image learning performance even using the data where the feature of the object is omitted as a portion of the image is omitted and may more accurately extract a class of the image.

Figure 15:
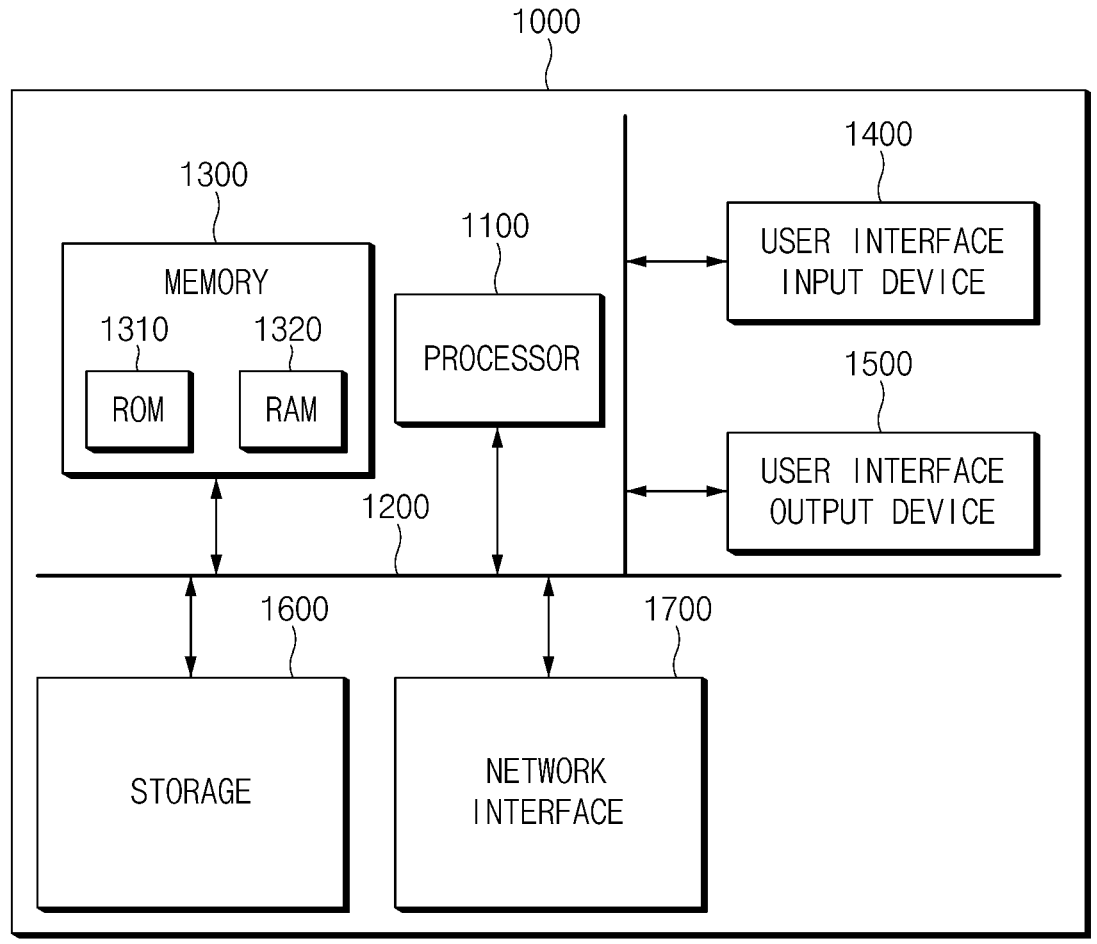
FIG. 15 shows an example of a computing system according to an example of the present disclosure.

FIG. 15 shows an example of a computing system according to an example of the present disclosure.

Referring to FIG. 15, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively or additionally, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present disclosure has been made to solve the above-mentioned problems.

An example of the present disclosure provides an apparatus for estimating a depth for more accurately estimating a depth value from a monocular image and a method thereof.

Furthermore, another example of the present disclosure provides an apparatus for estimating a depth for more accurately estimating a depth value even in a state where correct answer data is insufficient and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, an apparatus for estimating a depth may include a camera that obtains an image and a processor that performs deep learning of the image. The processor may obtain a first depth value based on learning the image, using a deep learning model, may obtain a partial image by masking a partial region of the image, may obtain a second depth value based on learning the partial image, using the deep learning model, and may train the deep learning model to reduce a deviation between the first depth value and the second depth value.

According to an example, the processor may learn training data expanded based on dimension conversion of the image or gradation conversion of the image to obtain the first depth value.

According to an example, the processor may divide the image into a plurality of patches on a patch-by-patch basis, may provide an encoder of the deep learning model with the plurality of patches, may output a first feature value using the encoder, may provide a decoder of the deep learning model with the first feature value, and may obtain the first depth value using the decoder.

According to an example, the processor may sample the partial region of the image divided on the patch-by-patch basis using a mask to obtain the partial images.

According to an example, the processor may use the masks set such that the patches sampled from each of the partial images do not overlap each other.

According to an example, the processor may provide the encoder with the partial images, may extract partial feature values for the partial images using the encoder, may concatenate the partial feature values to extract a second feature value, may provide the decoder with the second feature value, and may obtain the second depth value using the decoder.

According to an example, the processor may calculate a magnitude of a first loss function proportional to a deviation between the first feature value and the second feature value and may adjust a parameter of the encoder to reduce the magnitude of the first loss function.

According to an example, the processor may calculate a magnitude of a second loss function proportional to the deviation between the first depth value and the second depth value and may adjust a parameter of the deep learning model to reduce the magnitude of the second loss function.

According to an example, the processor may determine a degree of uncertainty of the deep learning model, the parameter of which is adjusted, based on the second loss function, and may adjust a weight of the second loss function based on the degree of uncertainty.

According to an example, the processor may obtain a first class based on learning the image, may obtain a second class based on learning the partial image, and may adjust a parameter of the deep learning model to reduce a deviation between the first class and the second class.

According to another example of the present disclosure, a depth estimating method may include obtaining a first depth value based on learning an image, using a deep learning model, obtaining partial images by masking a partial region of the image, obtaining a second depth value based on learning the partial images, using the deep learning model, and training the deep learning model to reduce a deviation between the first depth value and the second depth value.

According to an example, the obtaining of the first depth value may include learning training data expanded based on dimension conversion of the image or gradation conversion of the image.

According to an example, the obtaining of the first depth value may include dividing the image into a plurality of patches on a patch-by-patch basis, providing an encoder of the deep learning model with the plurality of patches, outputting a first feature value using the encoder, providing a decoder of the deep learning model with the first feature value, and obtaining the first depth value using the decoder.

According to an example, the obtaining of the partial images may include sampling a partial region of the image divided on the patch-by-patch basis, using a mask.

According to an example, the obtaining of the partial images may include using the masks set such that the patches sampled from each of the partial images do not overlap each other.

According to an example, the obtaining of the second depth value may include providing the encoder with the partial images, extracting partial feature values for the partial images using the encoder, concatenating the partial feature values to output a second feature value, providing the decoder with the second feature value, and obtaining the second depth value using the decoder.

According to an example, the training of the deep learning model may include calculating a magnitude of a first loss function proportional to a deviation between the first feature value and the second feature value and adjusting a parameter of the encoder to reduce the magnitude of the first loss function.

According to an example, the training of the deep learning model may include calculating a magnitude of a second loss function proportional to the deviation between the first depth value and the second depth value and adjusting a parameter of the deep learning model to reduce the magnitude of the second loss function.

According to an example, the depth estimating method may further include determining a degree of uncertainty of the deep learning model, the parameter of which is adjusted, based on the second loss function, and adjusting a weight of the second loss function based on the degree of uncertainty.

According to an example, the depth estimating method may further include obtaining a first class based on learning the image, obtaining a second class based on learning the partial images, and adjusting a parameter of the deep learning model to reduce a deviation between the first class and the second class.

According to an example of the present disclosure, the apparatus for estimating a depth may estimate a depth value using a single image, thus estimating a depth value from an image obtained by a 2D camera rather than a stereo camera.

Furthermore, according to an example of the present disclosure, the apparatus for estimating a depth may proceed with deep learning to make the result of learning a partial image where the feature of the image is omitted and the result of learning an original image be identical to each other to increase the accuracy of a deep learning model, thus more accurately estimating a depth value while reducing correct answer data.

In addition, various effects ascertained directly or indirectly through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus comprising:

a camera configured to capture an image comprising an object; and a processor configured to:

perform, based on a deep learning model, a deep learning process associated with the image;

obtain, based on the deep learning process associated with the image, a first depth value;

obtain a partial image by masking a partial region of the image;

perform, based on the deep learning model, a deep learning process associated with the partial image;

obtain, based on the deep learning process associated with the partial image, a second depth value;

train the deep learning model to reduce a deviation between the first depth value and the second depth value; and estimate, based on the trained deep learning model, a depth of the object.

2. The apparatus of claim 1, wherein the processor is configured to:

obtain the first depth value by performing a learning process associated with training data that is expanded based on at least one of:

dimension conversion of the image; or gradation conversion of the image.

3. The apparatus of claim 1, wherein the processor is configured to:

divide the image into a plurality of patches on a patch-by-patch basis;

perform, based on the plurality of patches, an encoding process for the deep learning model;

determine, based on the encoding process, a first feature value;

perform, based on the first feature value, a decoding process for the deep learning model; and obtain, based on the decoding process, the first depth value.

4. The apparatus of claim 3, wherein the processor is configured to:

obtain a plurality of partial images by sampling, using a mask, the partial region of the image divided on the patch-by-patch basis.

5. The apparatus of claim 4, wherein the processor is configured to use a set of masks to divide the image such that patches sampled from one of the partial images do not overlap with patches sampled from another one of the partial images.

6. The apparatus of claim 4, wherein the processor is configured to:

perform, based on the plurality of partial images, the encoding process;

generate, based on the encoding process, a plurality of feature values of the plurality of partial images;

obtain, based on a concatenation of the plurality of feature values, a second feature value;

perform, based on the second feature value, the decoding process; and obtain, based on the decoding process, the second depth value.

7. The apparatus of claim 6, wherein the processor is configured to:

determine, based on the deviation between the first feature value and the second feature value, a magnitude of a loss function; and adjust a parameter associated with the encoding process to reduce the magnitude of the loss function.

8. The apparatus of claim 1, wherein the processor is configured to:

determine, based on the deviation between the first depth value and the second depth value, a magnitude of a loss function; and adjust a parameter of the deep learning model to reduce the magnitude of the loss function.

9. The apparatus of claim 8, wherein the processor is configured to:

determine, based on the loss function and the adjusted parameter, a degree of uncertainty of the deep learning model; and adjust, based on the degree of uncertainty, a weight of the loss function.

10. The apparatus of claim 1, wherein the processor is configured to:

obtain a first class based on the deep learning process associated with the image;

obtain a second class based on the deep learning process associated with the partial image; and adjust a parameter of the deep learning model to reduce a deviation between the first class and the second class.

11. The apparatus of claim 1, wherein the processor is configured to:

control, based on the estimated depth of the image, autonomous driving of a vehicle.

12. A method comprising:

causing a camera to capture an image of an object;

performing, based on a deep learning model, a deep learning process associated with the image;

obtaining, based on the deep learning process associated with the image, a first depth value;

obtaining partial images by masking a partial region of the image;

performing, based on the deep learning model, a deep learning process associated with the partial images;

obtaining, based on the deep learning process associated with the partial images, a second depth value;

training the deep learning model to reduce a deviation between the first depth value and the second depth value; and estimating, based on the trained deep learning model, a depth of the object.

13. The method of claim 12, wherein the obtaining the first depth value includes:

performing a learning process associated with training data that is expanded based on at least one of dimension conversion of the image or gradation conversion of the image.

14. The method of claim 12, wherein the obtaining of the first depth value includes:

dividing the image into a plurality of patches on a patch-by-patch basis;

performing, based on the plurality of patches, an encoding process for the deep learning model;

outputting, based on the encoding process, a first feature value;

performing, based on the first feature value, a decoding process for the deep learning model; and obtaining, based on the decoding process, the first depth value.

15. The method of claim 14, wherein the obtaining the partial images includes:

sampling, using a mask, the partial region of the image divided on the patch-by-patch basis.

16. The method of claim 15, wherein the obtaining the partial images includes:

using a set of masks to divide the image such that the plurality of patches sampled from the partial images do not overlap each other.

17. The method of claim 15, wherein the obtaining the second depth value includes:

performing, based on the partial images, the encoding process;

generating, based on the encoding process, partial feature values for the partial images;

outputting, based on the partial feature values, a second feature value;

performing, based on the second feature value, the decoding process; and obtaining, based on the decoding process, the second depth value.

18. The method of claim 17, wherein the training of the deep learning model includes:

determining, based on the deviation between the first feature value and the second feature value, a magnitude of a loss function; and adjusting a parameter associated with the encoding process to reduce the magnitude of the loss function.

19. The method of claim 12, wherein the training of the deep learning model includes:

determining, based on the deviation between the first depth value and the second depth value, a magnitude of a loss function; and adjusting a parameter of the deep learning model to reduce the magnitude of the loss function.

20. The method of claim 19, further comprising:

determining, based on the loss function and the adjusted parameter, a degree of uncertainty of the deep learning model; and adjusting, based on the degree of uncertainty, a weight of the loss function.

* * * * *